(12) United States Patent
Chen et al.

(10) Patent No.: US 7,106,302 B2
(45) Date of Patent: Sep. 12, 2006

(54) WIRELESS POINTING DEVICE WITH FORCED POWER-OFF FUNCTION

(75) Inventors: Wen-Bin Chen, Taipei (TW); Yu-Quan Su, Taipei (TW)

(73) Assignee: Kye Systems Corp., Taipei (TW)

( * ) Notice: Subject to any disclaimer, the term of this patent is extended or adjusted under 35 U.S.C. 154(b) by 502 days.

(21) Appl. No.: 10/732,474

(22) Filed: Dec. 11, 2003

(65) Prior Publication Data
US 2004/0119694 A1    Jun. 24, 2004

(30) Foreign Application Priority Data
Dec. 13, 2002   (TW) ............................. 91220323 U

(51) Int. Cl.
*G09G 5/08* (2006.01)

(52) U.S. Cl. .................. 345/163; 345/158; 345/211; 710/62

(58) Field of Classification Search ............ 345/158, 345/163, 211; 710/62, 73
See application file for complete search history.

(56) References Cited

U.S. PATENT DOCUMENTS

| | | | | |
|---|---|---|---|---|
| 4,996,181 A | * | 2/1991 | Denny et al. ............... | 502/414 |
| 5,854,621 A | * | 12/1998 | Junod et al. ................ | 345/158 |
| 6,035,350 A | * | 3/2000 | Swamy et al. ............... | 710/73 |
| 6,070,247 A | * | 5/2000 | Wallace et al. .............. | 713/300 |
| 6,417,840 B1 | * | 7/2002 | Daniels ....................... | 345/158 |
| 6,801,967 B1 | * | 10/2004 | Nakamura et al. ........... | 710/62 |
| 7,003,600 B1 | * | 2/2006 | Fujikawa ...................... | 710/73 |
| 2003/0048254 A1 | * | 3/2003 | Huang ......................... | 345/163 |
| 2003/0193476 A1 | * | 10/2003 | Lu .............................. | 345/163 |
| 2004/0201572 A1 | * | 10/2004 | Wei ............................ | 345/163 |

FOREIGN PATENT DOCUMENTS

| | | |
|---|---|---|
| JP | 1-124250 | 5/1998 |
| JP | 11-224158 | 8/1999 |
| JP | 11-242560 | 9/1999 |

* cited by examiner

Primary Examiner—Richard Hjerpe
Assistant Examiner—Kimnhung Nguyen
(74) Attorney, Agent, or Firm—Birch, Stewart, Kolasch & Birch, LLP

(57) ABSTRACT

A wireless pointing device with forced power-off function includes a body and a power supply switch. The body includes a pointing module, a battery, and a wireless transmission module. The wireless transmission module transmits an indication signal providing from the pointing module. The power supply switch is located on an outer surface of the body to control ON and OFF of the power supply circuit of the battery. The power supply switch may be cut off manually, or through charging operation to completely cut off the power of the wireless pointing device to avoid electric power consumption and increase the service life of the battery.

12 Claims, 5 Drawing Sheets

WIRELESS POINTING DEVICE WITH FORCED POWER-OFF FUNCTION

This Nonprovisional application claims priority under 35 U.S.C. § 119(a) on Patent Application No(s). 91220323 filed in TAIWAN on Dec. 13, 2002, the entire contents of which are hereby incorporated by reference.

FIELD OF THE INVENTION

The invention relates to a wireless pointing device and particularly to a wireless pointing device with forced power-off function.

BACKGROUND OF THE INVENTION

To meet customer requirements, in addition to being slim and light, "wireless" has become a trend for the development of information appliances. "Wireless" means that information transmission and power supply have to adopt a new approach. As a result, wireless communication technology and electric charging technique have rapid innovation.

Take electric charging technique for instance. To increase charge capacity at a smaller size is a natural focus. However, to maintain long use time also is important. To meet this end, power saving technique has to be developed to increase power supply time of the charging elements. The design concept of power saving technique mainly aims to stop some power-hungry elements such as CPU and MCU (Microprocessor Control Unit) from operation when not in use, and start operation when in use so that electric power during standby mood may be saved. Meanwhile, the information appliances powered by charged battery can be used for a longer duration with the same amount of electricity.

Take the wireless mouse for example. In the present design, electric output continues even in the sleeping mode. This is because the wake-up device has to be maintained in an operation mode so that environmental changes resulting from user's operation action in the next cycle may be detected to activate the wireless mouse. Such a design is the main stream in the present market. Different techniques have been developed for switching the sleeping mode. For instance, U.S. Pat. No. 5,854,621 adopts a timer to wake up detection automatically. A wake up signal is output according to a selected time interval, and checks whether users are proceeding operations. Japan patent Nos. 11-224158 and 11-242560 employ a vibration detection mechanism to enable a wireless mouse to generate vibration and wake up signals. Japan patent, No. 10-124250, employs static charge to perform detection. All these designs have a common problem, i.e. the wake up device continuously consumes electric power in the sleeping mode. Once the standby mood time is extended for a prolonged duration, the batteries are empty and have to be recharged. Moreover, these designs, because of focusing on convenience, often overlook many environmental parameters. Switching of the sleeping mode usually is accomplished through a sensor approach. Mistaken wake up actions often occurs. Moreover, electric power is consumed excessively during the standby mood period.

A wireless mouse with a built-in charge battery, though it can compensate a lack of electricity, charges in the sleeping mode while the wake-up device consumes electric power. As a result, the battery cannot be fully charged. In addition, the battery is under a charging condition for a long period. It has a negative effect to battery service life. Even for machine models that do not have a sleeping mode, charging for a long period in the power-on mood also damages the service life of the battery.

SUMMARY OF THE INVENTION

In view of the previously mentioned disadvantages, the invention aims at providing a wireless pointing device with forced power-off function, which includes a body and a power supply switch. The body has a pointing module, a battery, and a wireless transmission module. The indication signal of the pointing module is transmitted through the wireless transmission module. The power supply switch is located on the outer surface of the body to control ON and OFF of the electricity supply circuit of the battery.

The invention can completely cut off the power supply of the wireless pointing device when not in use for a long period to save electric power of the battery and protect the battery.

The foregoing, as well as additional objects, features, and advantages of the invention will be more readily apparent from the following detailed description, which proceeds with reference to the accompanying drawings.

DESCRIPTION OF THE PREFERRED EMBODIMENTS

Figure 1:
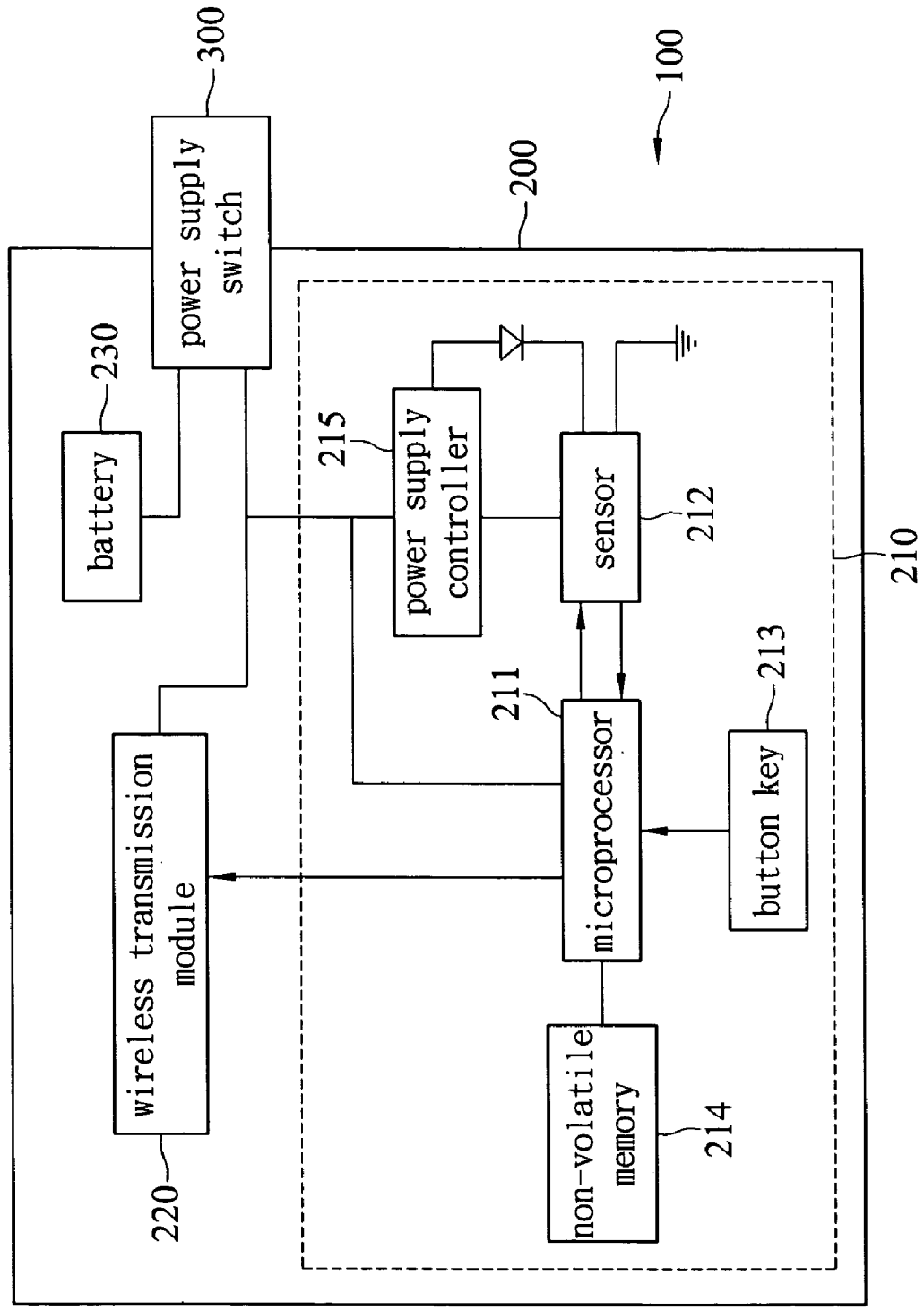
FIG. 1 is a system block diagram of a first embodiment of the wireless pointing device according to the invention.

Refer to FIG. 1 for a first embodiment that depicts the technical concept of the invention. The wireless pointing device 100 is a wireless optical mouse. It has a body 200, which includes a pointing module 210, a wireless transmission module 220, and a battery 230. The pointing module 210 consists of a microprocessor 211, a sensor 212, a button key 213, a non-volatile memory 214, and a power supply controller 215. When in use, the moving coordinates of the sensor 212 is detected, the pointing module 210 generates an index signal, and the wireless transmission module 220 transmits the signal to various types of computer systems or information appliances. The battery 230 is a "power source" to provide electricity to the pointing module 210 and wireless transmission module 220 through a power supply circuit (not shown in the drawing) for operation use. In order to provide a forced power-off function, this embodiment has a power supply switch 300 on the outer surface of the body 200. The power supply switch 300 controls a connection (ON) or a disconnecton (OFF) between the battery 230 and the power supply circuit. Hence, it activates the wireless pointing device 100 for operation or fully shuts down the operation.

Therefore, when the wireless pointing device 100 is not in use for a long period or taken out for a business travel, the power supply switch 300 can be turned off to shut down the entire power supply to save limited electricity. To avoid loss of the current set up after the power supply is shut down such as radio frequency setup, the non-volatile memory 214 provides the means needed.

Activation and closing of the power supply switch are elaborated in details by the following embodiments.

Figure 2A:
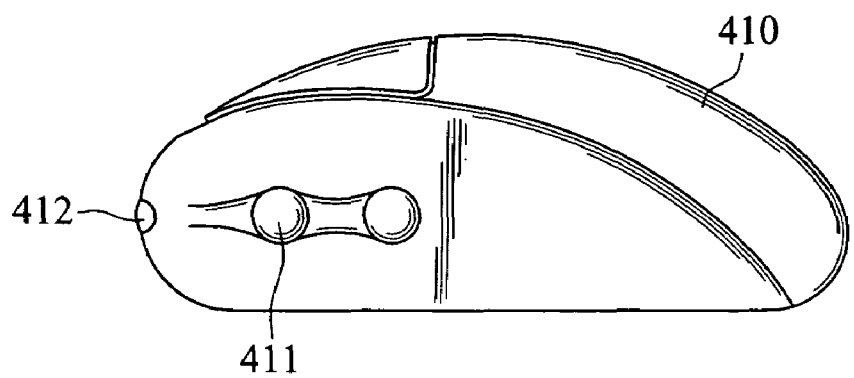
FIG. 2A is a side view of a second embodiment of the wireless pointing device according to the invention.
Figure 2B:
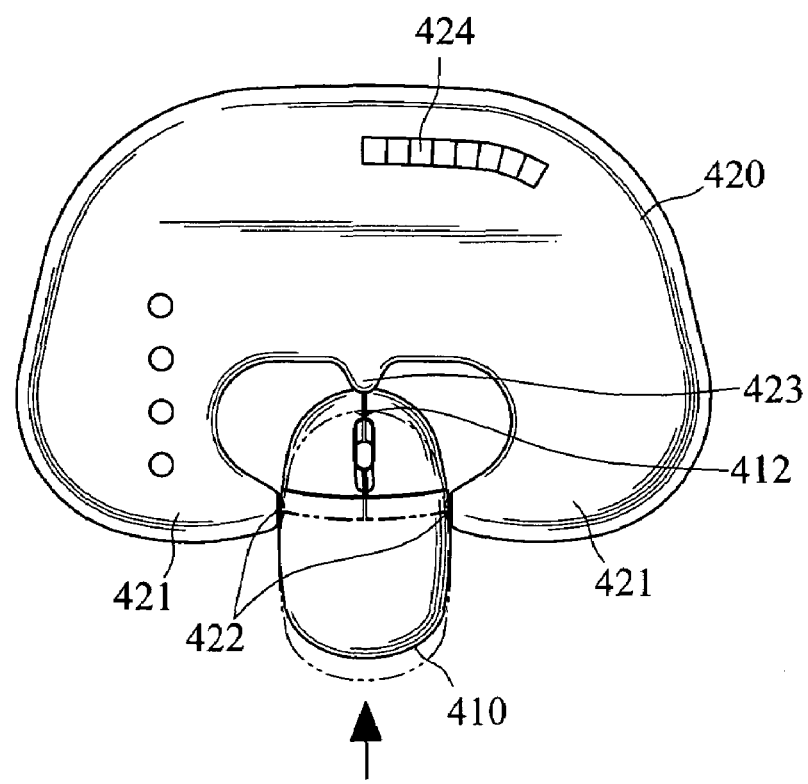
FIG. 2B is a schematic view of the second embodiment of the wireless pointing device according to the invention.

For a chargeable wireless pointing device, the activation and closing of the power supply switch may be coupled with the charge device and accomplished by coupling with the charge operation. Refer to FIGS. 2A and 2B for a second embodiment according to the invention. A wireless pointing device 410 and a charge device 420 are coupled. The wireless pointing device 410 has an electrode contact 411 on one side for charging. There is a power supply switch 412 located in the center of the front end that is a On-Off button switch which may be pressed to become OFF. The charge device 420 has two positioning ends 421 at the front side that have electrodes 422 on the distal ends for charging use. The charge device 420 has a compression section 423 extended from the center of the front side. When the wireless pointing device 410 is moved to the charge device 420 forward, the electrode contacts 411 and the electrodes 422 are coupled together to perform a charging process. When the charge is completed and indicated on an electricity display window 424 on the charge device 420, the wireless pointing device 410 may be moved forwards until the power supply switch 412 is compressed by the compression section 423 to turned off.

This embodiment couples the wireless pointing device that generates a linear motion during charging and turns off the power supply switch of the wireless pointing device through the compression section on the charge device. When the wireless pointing device 410 is not in use for a long period, it may be stationed in the charge device 420 and the power supply switch 412 can be completely turned off to prevent unexpected power consumption.

Figure 3A:
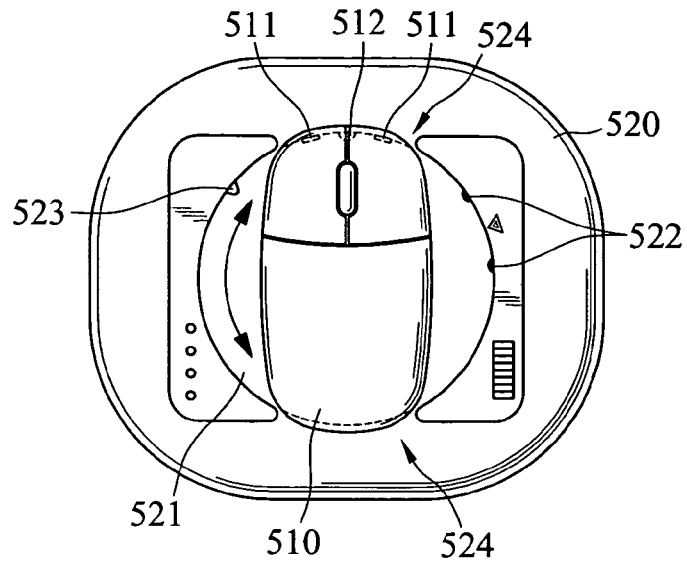
FIG. 3A is a top view of a third embodiment of the wireless pointing device according to the invention.
Figure 3B:
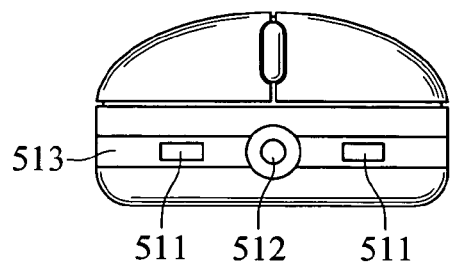
FIG. 3B is a front view of the third embodiment of the wireless pointing device according to the invention.
Figure 3C:
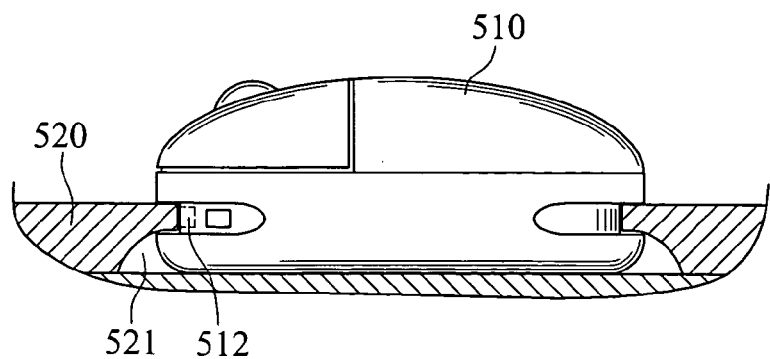
FIG. 3C is a schematic view of the third embodiment of the wireless pointing device according to the invention.

Refer to FIGS. 3A, 3B, and 3C for a third embodiment of the invention. A wireless pointing device 510 also is coupled with a charge device 520. The wireless pointing device 510 has a flute 513 located respectively on a front and a rear side. The front end has electrode contacts 511 on two sides and a power supply switch 512 in the center. The power supply switch 512 is a On-Off button, which may be pressed to become OFF. The charge device 520 has a round housing trough 521 on the topside to house the wireless pointing device 510. The housing trough 521 has two opposing notches 524 on the front and rear side. The housing trough 521 further has a peripheral edge extending inwards so that when the wireless pointing device 510 is inserted, its flute 513 may be coupled with the peripheral edge and turn. Moreover, the inner wall of housing trough 521 has charge electrodes 522 and a jutting compression section 523. The wireless pointing device 510 may be wedged into the housing trough 521 through the flutes 513 on the front and rear end, and make a right turned, the electrode contacts 511 will contact the electrodes 522 that enables the charge device 520 to charge the wireless pointing device 510. When it is turned to the left, the power supply switch 512 will be pressed by the compression section 523 that turns off the power supply to the wireless pointing device 510.

The second and third embodiments have a common condition, i.e. the wireless pointing device is located at a "first position" during charging, and the power supply switch is pressed by the compression section when the wireless pointing device is at a "second position". The "first position" and the "second position" are located on the same moving track where the wireless pointing device is performing charge operation. Of course, the function of the "first position" and the "second position" may be switched as desired depending on the user's requirements.

Figure 4A:
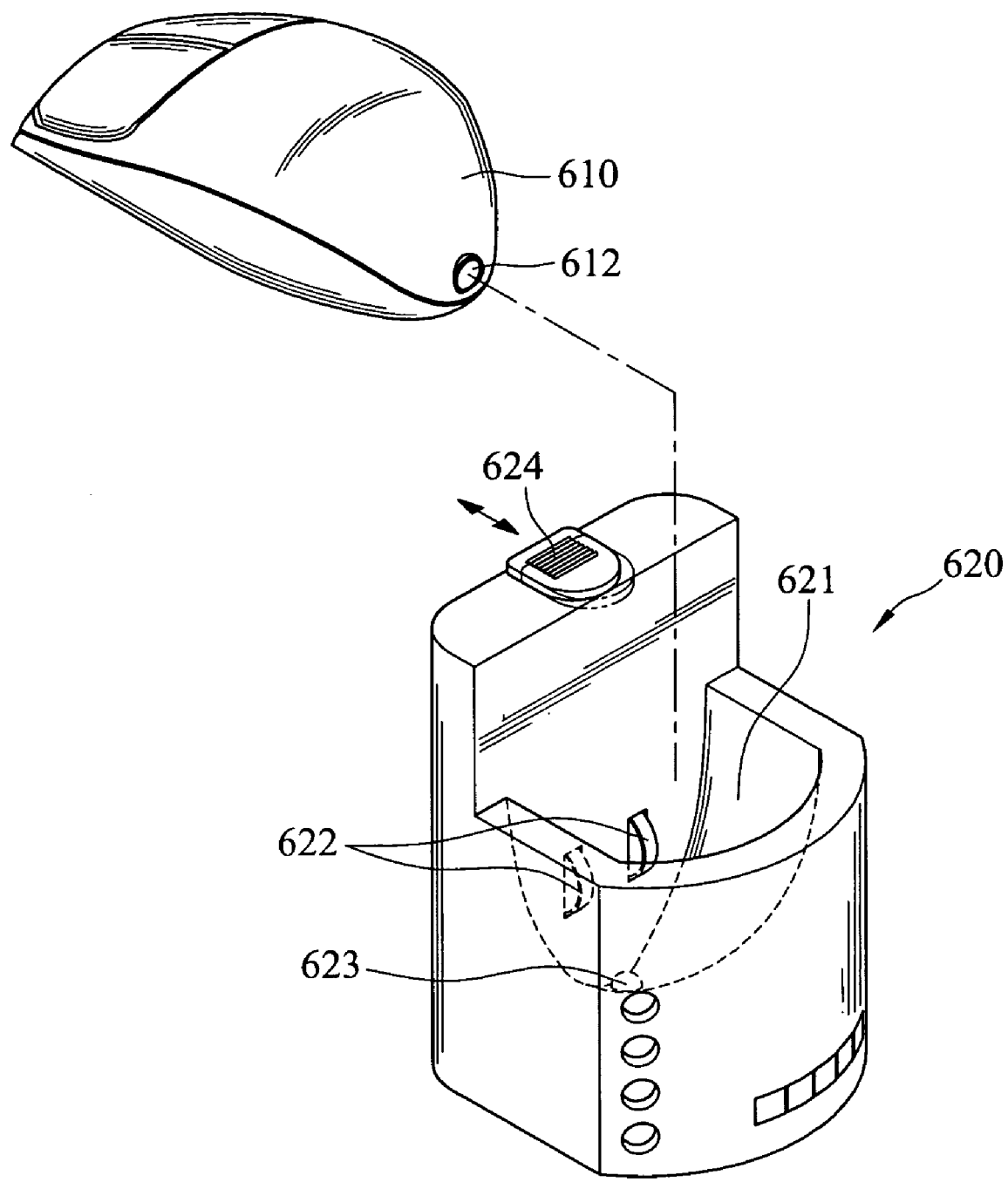
FIG. 4A is a schematic view of a fourth embodiment of the wireless pointing device according to the invention.
Figure 4B:
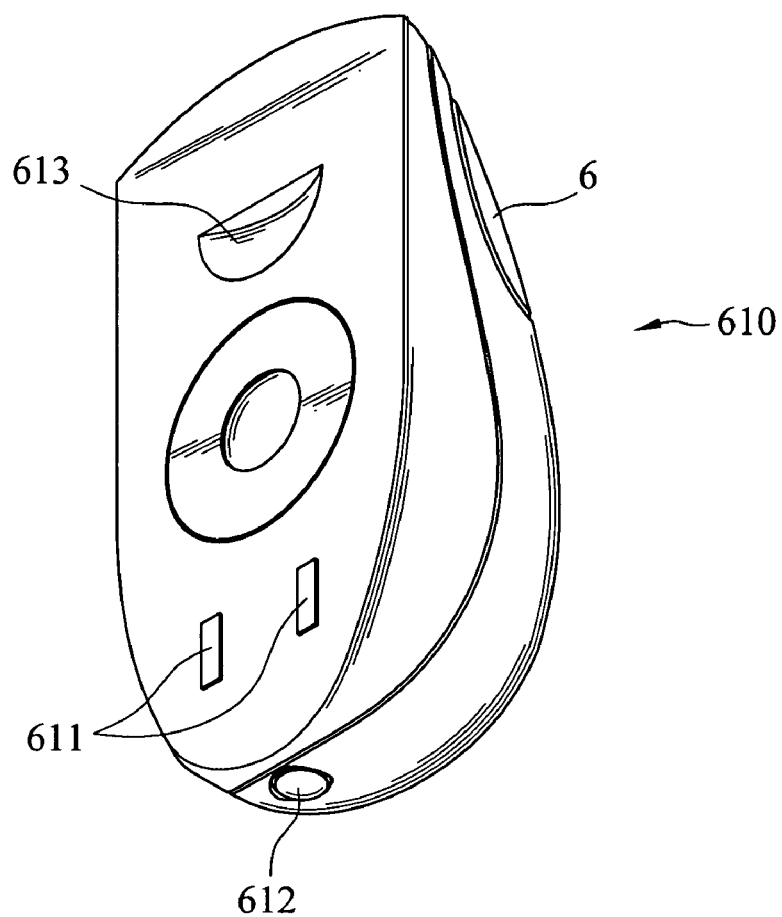
FIG. 4B is a rear view of the fourth embodiment of the wireless pointing device according to the invention.

Refer to FIGS. 4A and 4B for a fourth embodiment of the invention. A wireless pointing device 610 is coupled with a charge device 620. The wireless pointing device 610 has a wedge trough 613 located a rear side close to the front end. There are two electrode contacts 611 close to the rear side. There is a power supply switch 612 located in the center of the front end that is a two-way button which may be pressed to become ON or OFF. The charge device 620 has a housing trough 621 for holding the wireless pointing device 610 in a vertical manner. The housing trough 621 has two electrodes 622 on one side of the inner wall for charging use. There is an anchor plate 624 located above the electrodes 622 and movable forwards and rearwards. The bottom side of the housing trough 621 has a jutting compression section 623. For charging, place the wireless pointing device 610 by the rear end into the housing trough 621 of the charge device 620, with the wedged trough 613 of the backside retained by the anchor plate 624 without continuously moving downwards. The electrode contacts 611 are coupled with the electrodes 622 at the "first position" for charging as previously discussed. When the anchor plate 624 is moved away from the wedged trough 613, the wireless pointing device 610 may be moved downwards to have the power supply switch 612 pressing by the compression section 623. Thus by following the downward moving direction of the wireless pointing device 610, it can reach the "second position" where the power supply of the wireless pointing device 610 is cut off.

It is to be noted that the techniques employed in this invention may also be adapted to a wireless pointing device with a power saving switch function to offer consumers a desirable choice to meet their requirements. In addition, it is applicable whether the battery of the wireless pointing device is chargeable or not. Moreover, the charge devices 420, 520 and 620 may also be coupled with a conventional wireless receiver, or a wireless transceiver to enable the charge device 420 to equip multiple functions.

Figure 5:
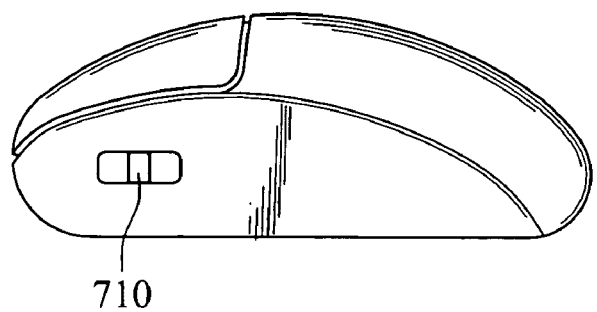
FIG. 5 is a side view of a fifth embodiment of the wireless pointing device according to the invention.

In short, the invention provides a wireless pointing device equipped with a power supply switch. The power supply switch is activated through a button key to couple with charge operation. As shown in FIG. 5, the power supply switch 710 may also be a sliding switch, movable linearly and activated manually. When the wireless pointing device is not in use for a long period, the power supply can be cut off to avoid electric power consumption and protect the service life of the battery. Please notice that the battery can be a regular battery or a rechargeable battery. The activation and closing operations of the invention are coupled with the charging operation, to provide a humanized design.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. A wireless pointing device with forced power-off function, comprising:
   a body having a power supply circuit connecting to a power supply; and
   a power supply switch located on a surface of the body;
   wherein the body further includes a pointing module and a wireless transmission module for transmitting an indicating signal from the pointing module to a computer system, and the power supply circuit providing electricity from the power supply to the pointing module and the wireless transmission module;
   wherein the power supply switch controls a connection and a disconnection between the power supply circuit and the power supply.

2. The wireless pointing device of claim 1, wherein the power supply switch is pressed by a compression section of a charge device to cause the disconnection.

3. The wireless pointing device of claim 2, wherein the charge device charges the wireless pointing device when the wireless pointing device is at a first position; and the power supply switch is pressed to be disconnection by the compression section at a second position.

4. The wireless pointing device of claim 3, wherein the first position and the second position are located on a same motion track.

5. The wireless pointing device of claim 4, wherein the wireless pointing device moves horizontally to reach the first position and the second position.

6. The wireless pointing device of claim 4, wherein the wireless pointing device moves vertically to reach the first position and the second position.

7. The wireless pointing device of claim 4, wherein the wireless pointing device horizontally rotates to reach the first position and the second position.

8. The wireless pointing device of claim 1, wherein the body further includes two electrode contacts, and the power supply is a chargeable battery.

9. The wireless pointing device of claim 2, wherein the power supply switch is a ON and OFF button.

10. The wireless pointing device of claim 1, wherein the power supply switch is a linear-moving switch.

11. The wireless pointing device of claim 1, wherein the power supply is a regular battery.

12. The wireless pointing device of claim 2, wherein the charge device further combines with a wireless receiver or a wireless transceiver.

* * * * *